UNITED STATES PATENT OFFICE.

DANIEL G. ZEIGLER, OF ATLANTA, GEORGIA.

COMPOSITION OF MATTER.

No. 923,925.  Specification of Letters Patent.  Patented June 8, 1909.

Application filed July 22, 1908. Serial No. 444,835.

*To all whom it may concern:*

Be it known that I, DANIEL G. ZEIGLER, citizen of the United States, residing at Atlanta, in the county of Fulton and State of Georgia, have invented certain new and useful Improvements in Composition of Matter, of which the following is a specification.

The present invention relates to the production of artificial building material from a plastic compound, the said artificial building material being adapted to be employed as a substitute for wood, steel and terra-cotta in any capacity where such materials are utilized, and also being adapted to be formed in plates which can be used for roofing purposes.

The compound is inexpensive in its composition and produces a product which is absolutely fire-proof and which does not absorb any moisture.

In carrying out the invention I mix the following ingredients in substantially the proportions specified: pulverized sand, stone, or slag 47%, Portland cement 36%, asbestos 10%, gum arabic 3%, pulverized alum 2% and beeswax 2%. The Portland cement and pulverized sand constitute the body portion of the compound, the quantity of the cement being substantially as above set forth but varying somewhat with different grades of the cement. It will be observed that the same is pulverized so that the compound has a homogeneous structure and is free from all solid grains or particles which would tend to weaken the same. The asbestos fibers which are embedded in the body portion constitute a binding means for holding the body portion together and preventing any cracking or breaking up of the finished product. The remaining ingredients, namely, the gum arabic, pulverized alum and beeswax constitute a water-proof medium and render the compound absolutely impervious to moisture after it has once set. A sufficient quantity of water is added to the ingredients to make the compound plastic and to cause the cement to set in the usual manner. The plastic compound is then subjected to pressure and is preferably molded in the desired shapes. After being thus compressed and molded the compound is permitted to harden and is preferably moistened at intervals until the cement has taken a permanent set. The plates or other shapes which are molded as above set forth have the advantage of being frost-proof and of not absorbing water so that they are not subject to disintegration in cold weather and do not increase in weight during moist weather. Furthermore, while the plates are extremely hard, nevertheless they are not brittle but on the other hand are tough and admit of nails being driven through them without cracking. It will thus be obvious that by mixing the various ingredients previously set forth, all of which when taken individually are inexpensive, in substantially the portions given, an extremely useful building material is obtained, the said building material being water-proof, fire-proof, and also having the advantages of hardness, strength, durability, and a certain quality of toughness which enables it to resist strains and shocks which would shatter ordinary brittle material such as slate.

In the preferred method of forming the compound the pulverized sand and cement are first mixed dry in the required proportions and the asbestos then added and the three ingredients again mixed. The alum and gum arabic which are in pulverized form are next added and the ingredients again mixed. Then the beeswax, which is melted, is added together with a slight quantity of water and a final mixing given to the materials. The plastic mass can then be molded into the desired forms, pressure being applied during the molding operation and the material being sprinkled after it is taken from the molds. It is also preferable that the forms which have been molded be occasionally sprinkled for several days until the cement shall have taken a final set.

Having thus described the invention, what is claimed as new is:

1. A composition of matter for the purpose specified, consisting of a body portion of sand and cement, a fibrous medium for binding the body portion together, and a water-proofing medium composed of gum arabic, alum and beeswax.

2. A composition of matter for the purpose specified, consisting of a body portion of pulverized sand and cement, asbestos, and a water-proofing medium composed of gum arabic, pulverized alum and beeswax.

3. A composition of matter for the purpose specified, consisting of pulverized sand 47%, Portland cement 36%, asbestos 10%, gum arabic 3%, pulverized alum 2%, and beeswax 2%.

In testimony whereof I affix my signature in presence of two witnesses.

DANIEL G. ZEIGLER. [L. s.]

Witnesses:
W. S. HILL,
W. N. WOODSON.